(12) United States Patent
Palmer

(10) Patent No.: US 10,853,238 B2
(45) Date of Patent: *Dec. 1, 2020

(54) UNALIGNED DATA COALESCING

(71) Applicant: Micron Technology, Inc., Boise, ID (US)

(72) Inventor: David A. Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/221,846

(22) Filed: Dec. 17, 2018

(65) Prior Publication Data

US 2019/0121730 A1 Apr. 25, 2019

Related U.S. Application Data

(63) Continuation of application No. 15/897,797, filed on Feb. 15, 2018, now Pat. No. 10,191,843, which is a continuation of application No. 13/175,388, filed on Jul. 1, 2011, now Pat. No. 9,898,402.

(51) Int. Cl.
*G06F 12/02* (2006.01)
*G06F 12/04* (2006.01)

(52) U.S. Cl.
CPC ........ *G06F 12/0246* (2013.01); *G06F 12/04* (2013.01); *G06F 2212/1016* (2013.01); *G06F 2212/1036* (2013.01); *G06F 2212/7203* (2013.01)

(58) Field of Classification Search
CPC ......... G06F 12/0868; G06F 2212/7201; G06F 2212/7203
USPC ........................................................ 711/103
See application file for complete search history.

(56) References Cited

U.S. PATENT DOCUMENTS

| 5,459,842 | A | 10/1995 | Begun et al. |
| 6,073,219 | A | 6/2000 | Ohno |
| 6,708,258 | B1 | 3/2004 | Potter et al. |
| 6,728,865 | B1 | 4/2004 | Coon et al. |

(Continued)

FOREIGN PATENT DOCUMENTS

| JP | H05151068 | 6/1993 |
| JP | H05181742 | 7/1993 |

(Continued)

OTHER PUBLICATIONS

International Search Report and Written Opinion for related PCT Application No. PCT/US2012/043996, dated Jan. 23, 2013, (10 pgs.).

(Continued)

*Primary Examiner* — Nathan Sadler
(74) *Attorney, Agent, or Firm* — Brooks, Cameron & Huebsch, PLLC

(57) ABSTRACT

The present disclosure includes methods and systems for coalescing unaligned data. One method includes receiving a first write command associated with a first unaligned portion of data, receiving a second write command associated with a second unaligned portion of data, and coalescing the first unaligned portion of data and the second unaligned portion of data, wherein coalescing includes writing the first unaligned portion of data and the second unaligned portion of data to a page in a memory device.

19 Claims, 3 Drawing Sheets

(56) References Cited

U.S. PATENT DOCUMENTS

| | | | |
|---|---|---|---|
| 6,928,515 | B2 | 8/2005 | Hassner et al. |
| 7,437,537 | B2 | 10/2008 | Bridges et al. |
| 9,898,402 | B2 * | 2/2018 | Palmer ................ G06F 12/0246 |
| 10,191,843 | B2 * | 1/2019 | Palmer ................ G06F 12/0246 |
| 2005/0144360 | A1 | 6/2005 | Bennett et al. |
| 2006/0036817 | A1 | 2/2006 | Oza et al. |
| 2006/0136656 | A1 | 6/2006 | Conley et al. |
| 2006/0149890 | A1 | 7/2006 | Gorobets |
| 2006/0155921 | A1 | 7/2006 | Gorobets et al. |
| 2008/0183949 | A1 | 7/2008 | Ly et al. |
| 2008/0250195 | A1 | 10/2008 | Chow et al. |
| 2009/0019234 | A1 | 1/2009 | Im et al. |
| 2009/0077108 | A1 | 3/2009 | Burnett |
| 2009/0204872 | A1 | 8/2009 | Yu et al. |
| 2009/0222628 | A1 | 9/2009 | Yano et al. |
| 2010/0023682 | A1 | 1/2010 | Lee et al. |
| 2010/0037009 | A1 | 2/2010 | Yano et al. |
| 2010/0079904 | A1 | 4/2010 | Sato |
| 2010/0088467 | A1 | 4/2010 | Lee et al. |
| 2010/0180105 | A1 | 7/2010 | Asnaashari et al. |
| 2010/0287330 | A1 | 11/2010 | Su et al. |
| 2011/0072060 | A1 | 3/2011 | Dodge |
| 2013/0073784 | A1 | 3/2013 | Ng et al. |

FOREIGN PATENT DOCUMENTS

| | | |
|---|---|---|
| JP | H06103151 | 4/1994 |
| JP | 2005141420 | 6/2005 |
| JP | 2009015364 | 1/2009 |
| TW | 200639702 | 11/2006 |

OTHER PUBLICATIONS

Office Action for related Japan Patent Application No. 2014-518887, dated Jan. 27, 2015, 8 pages.

Office Action for related Taiwan Patent Application No. 10-2014-7001591, dated Dec. 24, 2014, 15 pages.

Notice of Rejection for related Korea Patent Application No. 10-2014-7001591, dated Apr. 1, 2015, 20 pages.

Supplementary European Search Report for related EP Patent Application No. 12808040.5, dated May 15, 2015, 7 pages.

Notice of Rejection for related Japan Patent Application No. 2014-518887, dated May 26, 2015, 11 pages.

Notice of Rejection for related Korea Patent Application No. 10-2014-7001591, dated Oct. 19, 2015, 9 pages.

Office Action for related China Patent Application No. 201280039444.5, dated Aug. 27, 2015, 26 pages.

Decision of Rejection for related Korea Patent Application No. 10-014-7001591, dated Jan. 20, 2016, 8 pages.

Notice of Rejection for related Korea Patent Application No. 10-2016-7003854, dated Sep. 18, 2017, 14 pages.

IEEE. IEEE 100: The Authoritative Dictionary of IEEE Standard Terms. Dec. 2000. IEEE Press. 7th ed. p. 234.

Microsoft. Microsoft Computer Dictionary. 2002. Microsoft Press. 5th ed. p. 160.

English translation of JP2005-141420.

Craig Silverstein. "Implementation of sparse_hash_map, dense_hash_map, and sparsetable." Jan. 2005. http://google-sparsehash.googlecode.com/svn/trunk/doc/implementation.html.

Communication Pursuant to Article 94(3) for related EP Application No. 12808040.5, dated Mar. 29, 2018, 10 pages.

Notice of Rejection for related Korea Patent Application No. 10-2016-7003854, dated Mar. 27, 2018, 6 pages.

* cited by examiner

311 ─▶

| | LA (312) | START ADDRESS (314) | END ADDRESS (316) | POINTER (318) |
|---|---|---|---|---|
| 315-0 | LA-0 | SA-0 | EA-0 | P-0 |
| 315-1 | LA-1 | SA-1 | EA-1 | P-1 |
| 315-2 | LA-2 | SA-2 | EA-2 | P-2 |
| 315-3 | LA-3 | SA-3 | EA-3 | P-3 |
| 315-4 | LB-4 | SA-4 | EA-4 | P-4 |
| 315-5 | LA-5 | SA-5 | EA-5 | P-5 |
| 315-6 | LA-6 | SA-6 | EA-6 | P-6 |
| 315-7 | LA-7 | SA-7 | EA-7 | P-7 |

| | LA (312) | START ADDRESS (314) | END ADDRESS (316) | POINTER (318) |
|---|---|---|---|---|
| 319-0 | LA-0 | SA-0 | EA-0 | P-0 |
| 319-1 | LA-1 | SA-1 | EA-1 | P-1 |
| 319-2 | LA-2 | SA-2 | EA-2 | P-2 |
| 319-3 | LA-3 | SA-3 | EA-3 | P-3 |
| 319-4 | LB-4 | SA-4 | EA-4 | P-4 |
| 319-5 | LA-5 | SA-5 | EA-5 | P-5 |
| 319-6 | LA-6 | SA-6 | EA-6 | P-6 |
| 319-7 | LA-7 | SA-7 | EA-7 | P-7 |

UNALIGNED DATA COALESCING

PRIORITY INFORMATION

This application is a Continuation of U.S. application Ser. No. 15/897,797, filed Feb. 15, 2018 and issued as U.S. Pat. No. 10,191,843 on Jan. 29, 2019, which is a Continuation of U.S. application Ser. No. 13/175,388, filed Jul. 1, 2011 and issued as U.S. Pat. No. 9,898,402 on Feb. 20, 2018, the contents of which are included herein by reference.

TECHNICAL FIELD

The present disclosure relates generally to semiconductor memory devices and methods, and more particularly, to methods and systems for coalescing unaligned data.

BACKGROUND

Memory devices are typically provided as internal, semiconductor, integrated circuits and/or external removable devices in computers or other electronic devices. There are many different types of memory including random-access memory (RAM), read only memory (ROM), dynamic random access memory (DRAM), synchronous dynamic random access memory (SDRAM), phase change random access memory (PCRAM), and flash memory, among others.

Memory devices are utilized as non-volatile memory for a wide range of electronic applications in need of high memory densities, high reliability, and low power consumption. Non-volatile memory may be used in a personal computer, a portable memory stick, a solid state drive (SSD), a personal digital assistant (PDA), a digital camera, a cellular telephone, a portable music player, e.g., an MP3 player, and a movie player, among other electronic devices.

A memory system can receive write commands from a host that are associated with data to be written to one or more memory devices of the memory system. A memory system may write data in portions that are larger than a data transfer size of the host. For example, a data transfer size of a host may be a sector, e.g., 512-528 bytes of data. However, a memory system may transfer data to/from a memory device in pages, which can include multiple sectors, e.g., 4096 bytes of data or more, for instance. Each sector of data written to and/or read from a memory device can be associated with a particular logical address.

Since the data transfer size of the host can be smaller than the page size of a memory device, operations that can be referred to as read-modify-write (RMW) operations can occur. For instance, writing an amount of data smaller than a page size to a memory device can include reading an entire page of data from the memory device, updating the page with new data, and then writing the updated page back to the memory device. Performing read-modify-write operations can increase wear associated with a memory system and can reduce performance of a memory system, among other drawbacks. As an example, if data corresponding to 5 logical addresses is to be written to a memory device in association with 5 sequential write commands, then 5 separate read-modify-write processes may be performed to write the data to the memory device.

BRIEF DESCRIPTION OF THE DRAWINGS

FIG. 3A illustrates a read coalescing data structure in accordance with one or more embodiments of the present disclosure.

FIG. 3B illustrates a write coalescing data structure in accordance with one or more embodiments of the present disclosure.

DETAILED DESCRIPTION

Figure 1:
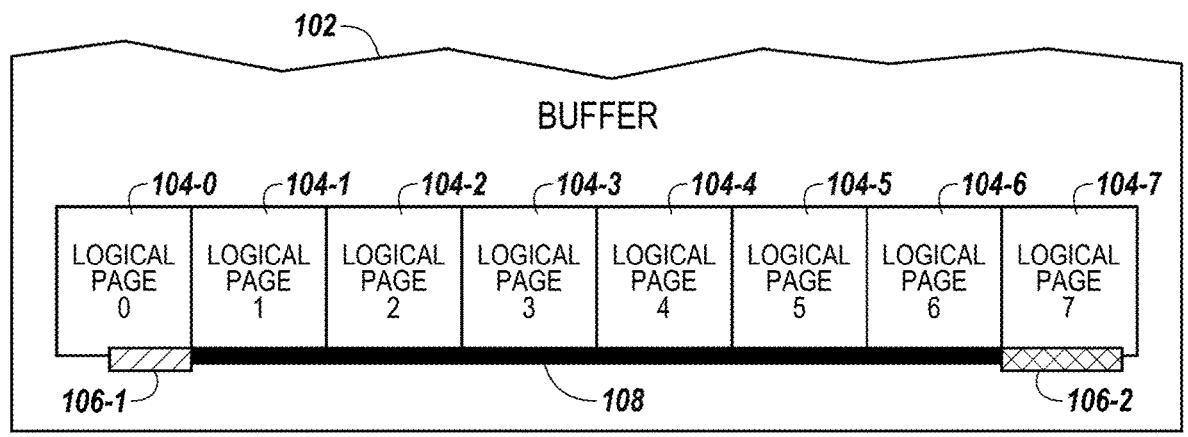
FIG. 1 illustrates data associated with a write command in accordance with one or more embodiments of the present disclosure.

The present disclosure includes methods and systems for coalescing unaligned data. One method includes receiving a first write command associated with a first unaligned portion of data, receiving a second write command associated with a second unaligned portion of data, and coalescing the first unaligned portion of data and the second unaligned portion of data, wherein coalescing includes writing the first unaligned portion of data and the second unaligned portion of data to a page in a memory device.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of memory devices can refer to one or more memory devices. Additionally, the designators "N" and "M" as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 illustrates data associated with a write command in accordance with one or more embodiments of the present disclosure. In this example, the data is stored in a buffer 102, which can be located in DRAM associated with a controller, for instance. The data stored in buffer 102 can include data associated with a write command received from a host, data read from a memory system, and/or data associated with a coalescing data structure, e.g., a tree and/or a table, among other data structures. A write command from a host can include a number of portions of data, e.g., sectors, to be written to a memory device. Each sector can be associated with a logical address and the sectors can be stored in the buffer in logical pages. Each logical page can include a number of sectors, such as 8 sectors, for example.

In the example illustrated in FIG. 1, the data associated with the write command can include a first unaligned portion 106-1, a second unaligned portion 106-2, and an aligned portion 108. The aligned portion 108 starts and ends in full page increments. In this example, the aligned portion 108 starts at the beginning of logical page 104-1, completely fills logical pages 104-2, 104-3, 104-4, and 104-5, and ends at the end of logical page 104-6. The aligned portion 108 includes 8 sectors in each of the pages 104-1 to 104-6 and the 8 sectors in each page start and/or end at the beginning and/or end of a logical page. The aligned portion 108 can be written to a memory device immediately, while the first unaligned portion 106-1 and/or the second unaligned portion 106-2 remain in the controller for coalescing with unaligned portions of data associated with subsequent write commands. In this example, each logical page 104-0 to 104-7 can store data associated with 8 logical addresses (LAs). For instance, logical page 104-0 can store data associated with LA-0 to LA-7, logical page 104-1 can store data associated with LA-8 to LA-15, logical page 104-2 can store data associated with LA-16 to LA-23, logical page 104-3 can store data associated with LA-24 to LA-31, logical page 104-4 can store data associated with LA-32 to LA-39, logical page 104-5 can store data associated with LA-40 to LA-47, logical page 104-6 can store data associated with LA-48 to LA-55, and logical page 104-7 can store data associated with LA-56 to LA-63.

The first unaligned portion 106-1 is to be stored in logical page 104-0, which can store data associated with 8 logical addresses, e.g., LA-0 to LA-7. In this example, the first unaligned portion 106-1 includes 4 sectors corresponding to LA-4 to LA-7 of page 104-0. The first sector of first unaligned portion 106-1 is at LA-4 of logical page 104-0. The unaligned portion 106-1 includes sectors at LA-4, LA-5, LA-6, and LA-7 of logical page 104-0. The first sector of the aligned portion 108 is aligned at LA-8 of page 104-1.

The second unaligned portion 106-2 is to be stored in logical page 104-7, which can store data associated with 8 logical addresses, e.g., LA-56 to LA-63. In this example, the second unaligned portion 106-2 includes 6 sectors corresponding to LA-56 to LA-61 of page 104-7. The first sector of second unaligned portion 106-2 is at LA-56 of logical page 104-7. The second unaligned portion 106-2 includes sectors at LA-56, LA-57, LA-58, LA-59, LA-60, and LA-61 of logical page 104-7. The last sector of the aligned portion 108 is aligned at LA-55 of logical page 104-6.

In one or more embodiments, the first unaligned portion of data 106-1 and/or the second unaligned portion of data 106-2 can be written to an associated page in a memory device along with other sectors of data such that the associated page includes write data sectors in addition to those of the first unaligned portion of data 106-1 and/or the second unaligned portion of data 106-2. In one or more embodiments, the data from the first unaligned portion of data 106-1 can be coalesced with data from other write commands that include logical addresses corresponding to the same page of data associated with the logical addresses of the first unaligned portion of data 106-1. The data from the second unaligned portion of data 106-2 can be coalesced with data from other write commands that include logical addresses corresponding to the same page of data associated with the logical addresses of the second unaligned portion of data 106-2. The data that is coalesced can be written to the page in a memory device such that the page is aligned, e.g. the data starts at the beginning and/or ends at the end of the page.

Figure 2:
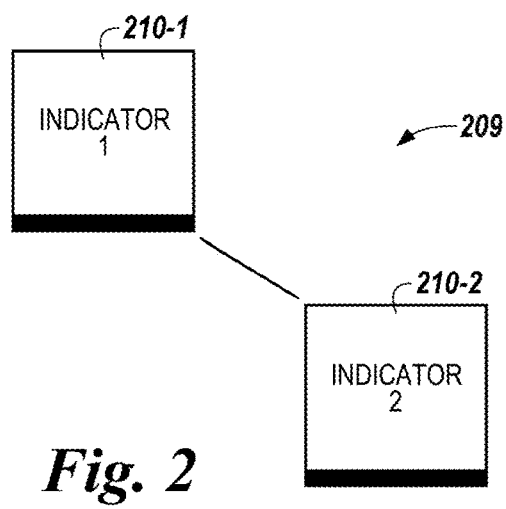
FIG. 2 illustrates a coalescing identification data structure in accordance with one or more embodiments of the present disclosure.

FIG. 2 illustrates a coalescing identification data structure 209 in accordance with one or more embodiments of the present disclosure. Coalescing identification data structure 209 is a data structure storing indicators that refer to logical addresses determined to be associated with unaligned portions of data and the logical page corresponding thereto. For instance, the coalescing identification data structure 209 could store indicators that refer to LA-4 to LA-7 corresponding to logical page 104-0 and LA56- to LA-61 corresponding to logical page 104-7 in FIG. 1. The coalescing identification data structure 209 can be stored in a buffer of a controller, e.g., buffer 102 in FIG. 1. As an example, indicator 210-1 in coalescing identification data structure 209 can refer to logical page 104-0, which is the logical page associated with the first unaligned portion of data 106-1. Indicator 210-2 in coalescing identification data structure 209 can refer to logical page 104-7, which is the logical page associated with the second unaligned portion of data 106-2. The data in a memory device associated with the logical addresses corresponding to the logical pages associated with unaligned portions of a write command, e.g., first unaligned portion 106-1 and second unaligned portion 106-2 in FIG. 1, can be read and stored in a buffer.

In one or more embodiments, when sectors of data associated with a write command are unaligned, e.g., associated with a page having sectors of data that do not start at the beginning of a logical page and/or do not finish at an end of a logical page, an indicator that refers to the logical addresses associated with the unaligned sectors of data and the logical page corresponding to those logical addresses can be created. The created indicator can then be compared to indicators present in a coalescing identification data structure, e.g., 209, that also refer to logical addresses associated with unaligned sectors of data and the logical page corresponding to those logical addresses. When the created indicator refers to a logical page that another indicator in the coalescing identification data structure also refers to, the write command for the unaligned sectors of data and the write command for the data associated the indicator in the coalescing identification data structure can be coalesced so that the data for each write command is written to a common page of a memory device.

For example, a controller can receive a write command that is associated with first unaligned portion 106-1 in FIG. 1. An indicator that refers to LA-4 to LA-7, which are the logical addresses corresponding to the first unaligned portion 106-1, and to logical page 104-0, which is associated with LA-4 to LA-7, can be created. The created indicator can be compared to indicators 210-1 and 210-2 in the coalescing identification data structure 209 in FIG. 2. The indicator 210-1 can refer to LA-1 to LA-3, which are logical addresses corresponding to an unaligned portion associated with another write command received by the controller, of logical page 104-0, which is associated with LA-1 to LA-3. The first unaligned portion 106-1 and the unaligned portion associated with another write command can be coalesced and written to a common page in a memory device because the indicator created for the first unaligned portion 106-1 and indicator 210-1 both refer to logical page 104-0 and the logical addresses, LA-1 to LA-3 of the unaligned portion from another write command and LA-4 to LA-7 of the first unaligned portion 106-1 do not include common logical addresses. Coalescing the unaligned portion of data associated with another write command and the first unaligned portion 106-1 can include writing the data corresponding to LA-0 to LA-7 from two different write commands to a common page in a memory system. The data associated with the two different write commands stored in the common page in the memory system will be aligned because the data will start at the beginning of the common page and end at the end of the common page.

In one or more embodiments, when sectors of data associated with a write command are unaligned, an indicator that refers to the logical addresses associated with the unaligned sectors of data and the logical page corresponding to those logical addresses can be created. The created indicator can then be compared to indicators present in a coalescing identification data structure that also refer to logical addresses associated with unaligned sectors of data and the logical page corresponding to those logical addresses. When the created indicator refers to a logical page that is not referred to by another indicator already present in the coalescing identification data structure, the created indicator can be placed in the coalescing identification data structure to be compared to other indicators that refer to logical addresses associated with unaligned sectors of data from other write commands received by the controller and to the logical page corresponding to those logical addresses.

For example, a controller can receive a write command associated with first unaligned portion 106-1 in FIG. 1. An indicator that refers to LA-4 to LA-7, which are the logical addresses corresponding to the first unaligned portion 106-1, and to logical page 104-0, which is associated with LA-4 to LA-7, can be created. The created indicator can be compared to indicators in the coalescing identification data structure 209 in FIG. 2. The created indicator refers to a logical page 104-0 which is not referred to by another indicator in the coalescing identification data structure. Therefore the created indicator can be placed in the coalescing identification data structure as indicator 210-1. Indicator 210-1 can refer to LA-4 to LA-7, which are logical addresses corresponding to the first unaligned portion 106-1, and to logical page 104-0, which is associated with LA-4 to LA-7. Indicator 210-1 can be compared to a second indicator that refers to logical page 104-0. The second indicator that refers to logical page 104-0 can be created in response to a write command associated with unaligned data that corresponds to logical addresses LA-0 to LA-3. The first unaligned portion 106-1 and the unaligned data associated with the write command having unaligned data corresponding to logical addresses LA-0 to LA-3 can be coalesced and written to a common page in a memory device because the indicator referring to logical page 104-0, and the logical addresses LA-1 to LA-3 for the unaligned data from a write command referred to by the second indicator and the logical addresses LA4 to LA-7 referred to by indicator 210-1 do not include common logical addresses. Coalescing the unaligned data from a write command having unaligned data corresponding to logical addresses LA-0 to LA-3 and the first unaligned portion 106-1 can include writing data corresponding to LA-0 to LA-7 that was associated with two different write commands to a common page in a memory system. The data associated with the two different write commands stored in the common page in the memory system will be aligned because the data will start at the beginning of the common page and end at the end of the common page.

When sectors of data associated with a write command are unaligned, an indicator that refers to the logical addresses associated with the unaligned sectors of data and the logical page corresponding to those logical addresses can be compared to other indicators in a coalescing identification data structure. If the indicator that refers to the logical page corresponding to the logical addresses associated with the unaligned sectors is not present in a coalescing identification data structure, the indicator can be placed in the coalescing identification data structure. The indicator can be compared to other incoming indicators that refer to the logical addresses associated with other unaligned portions of data and their associated logical page. If the indicator and other incoming indicators refer to logical addresses that are different, but are associated with a common logical page, unaligned sectors of data associated with the write commands having indicators referring to the common logical page can be coalesced so that the data for each write command is written to a common page in a memory device in a single, e.g., one, write operation.

Indicators in a coalescing identification data structure can be stored and compared to other indicators referring to logical addresses associated with unaligned sectors of data while the controller is processing a write command. Once the unaligned data associated with the write command is written to the memory device, indicators referring to the logical addresses associated with the unaligned data in the coalescing identification data structure are erased. The coalescing identification data structure can accept indicators referring to logical addresses associated with unaligned data in subsequent write commands received by the controller.

In one or more embodiments, a controller can receive a first command associated with a first unaligned portion of data associated with LA-0 corresponding to logical page 0. A first indicator, associated with the first unaligned portion of data, referring to the LA-0 and logical page 0 can be created and placed in a coalescing identification data structure. The controller can receive a second command associated with a second unaligned portion of data associated with LA-1 corresponding to logical page 0. A second indicator, associated with the second unaligned portion of data, referring to the LA-1 and logical page 0 can be created and placed in a coalescing identification data structure. The controller can receive a third command associated with a third unaligned portion of data associated with LA-2 corresponding to logical page 0. A third indicator, associated with the third unaligned portion of data, referring to the LA-2 and logical page 0 can be created and placed in a coalescing identification data structure. The controller can receive a fourth command associated with a fourth unaligned portion of data associated with LA-3 corresponding to logical page 0. A fourth indicator, associated with the fourth unaligned portion of data, referring to the LA-3 and logical page 0 can be created and placed in a coalescing identification data structure. The controller can receive a fifth command associated with a fifth unaligned portion of data associated with LA-4 corresponding to logical page 0. A fifth indicator, associated with the fifth unaligned portion of data, referring to the LA-4 and logical page 0 can be created and placed in a coalescing identification data structure.

The first indicator, the second indicator, the third indicator, the fourth indicator, and the fifth indicator can be compared. A determination that the first indicator, the second indicator, the third indicator, the fourth indicator, and the fifth indicator each refer to logical page 0 and do not refer to a common logical address can be made. Therefore, the first unaligned portion of data, second unaligned portion of data, third unaligned portion of data, fourth unaligned portion of data, and fifth unaligned portion of data can be coalesced and written to a common page in a memory device in a single write operation, avoiding having to perform a read-modify-write operation for each of the commands.

FIG. 3A illustrates a read coalescing data structure 311 in accordance with one or more embodiments of the present disclosure. The read coalescing data structure 300 includes a first column 312 that indicates logical addresses (LAs) associated with sectors of data, a second column 314 that includes start addresses of sectors of data in the buffer, a third column 316 that includes end addresses of sectors of data in the buffer, and a fourth column 318 that includes pointers to logical addresses. The pointers in column 318 can point to the next logical address in the read coalescing data structure. The read coalescing data structure can store entries of LAs, start addresses, end addresses, and pointers to logical addresses for logical pages that are identified by indicators in the coalescing identification data structure. The read coalescing data structure can include entries of LAs, start addresses, end addresses, and pointers corresponding to unaligned portions of data received in a write command corresponding to a logical page identified by an indicator in a coalescing identification data structure and data read from a memory device corresponding with the logical page identified by the indicator in the coalescing identification data structure.

In the example shown in FIG. 3A, each row in the read coalescing data structure includes a number of entries. Each entry corresponds to a sector of data that is stored in the buffer. For instance, entry 315-0 corresponds to data associated with the logical address LA-0, the start address SA-0, the end address EA-0, and the pointer P-0. Entry 315-1 corresponds to data associated with the logical address LA-1, the start address SA-1, the end address EA-1, and the pointer P-1. Entry 315-2 corresponds to data associated with the logical address LA-2, the start address SA-2, the end address EA-2, and the pointer P-2. Entry 315-3 corresponds to data associated with the logical address LA-3, the start address SA-3, the end address EA-3, and the pointer P-3. Entry 315-4 corresponds to data associated with the logical address LA-4, the start address SA-4, the end address EA-4, and the pointer P-4. Entry 315-5 corresponds to data associated with the logical address LA-5, the start address SA-5, the end address EA-5, and the pointer P-5. Entry 315-6 corresponds to data associated with the logical address LA-6, the start address SA-6, the end address EA-6, and the pointer P-6. Entry 315-7 corresponds to data associated with the logical address LA-7, the start address SA-7, the end address EA-7, and the pointer P-7.

In one or more embodiments, unaligned sectors of data can be associated with a number of logical addresses that correspond to a logical page. When a controller receives a write command associated with unaligned sectors of data corresponding to a logical page, data from a memory device associated with logical addresses corresponding to the logical page can be read from the memory device and can be stored in a buffer in the controller. The logical addresses, start addresses, end addresses, and pointers corresponding to the data read from the memory device can be stored in a read coalescing data structure.

For example, a controller can receive a write command associated with first unaligned portion 106-1 in FIG. 1. The first unaligned portion 106-1 is associated with LA-4 to LA-7. LA-4 to LA-7 correspond to logical page 104-0, which is associated with LA-0 to LA-7. Data from a memory device associated with LA-0 to LA-7 can be read by the controller and stored in a buffer of the controller and an indicator can be stored in a coalescing identification data structure to identify that logical page 104-0 corresponds to the first unaligned portion 106-1. Each sector of data associated with LA-0 to LA-7 can have an entry in read coalescing data structure 311, with entries 315-0, 315-1, 315-2, and 315-3 corresponding to data read from a memory device and stored in the buffer of the controller and entries 315-4, 315-5, 315-6, and 315-7 corresponding to the first unaligned portion 106-1. The entries in the read coalescing data structure 311 can be associated with a logical page indicated by indicators stored in a coalescing identification data structure. For example, entry 315-0 in read coalescing data structure 311 includes the logical address, LA-0; the start address in the buffer, SA-0; the end address in the buffer, EA-0; and the pointer to the next entry, P-0, for the first sector of data read from the memory device and stored in the buffer.

In one or more embodiments, entries 315-0, 315-1, 315-2, 315-3, 315-4, 315-5, 315-6, and 315-7 in read coalescing data structure 311 can be used when coalescing unaligned sectors of data from write commands having indicators referring to a common logical page. Entries 315-0, 315-1, 315-2, 315-3, 315-4, 315-5, 315-6, and 315-7 in read coalescing data structure 311 correspond to data associated with logical page 104-0, which indicator 210-1 in coalescing identification data structure in FIG. 2 can identify. Entries 315-4, 315-5, 315-6, and/or 315-7 can be used to populate write coalescing data structure 313 in FIG. 3B when the first unaligned portion 106-1 is to be coalesced with another unaligned portion corresponding to logical page 104-0, which will be described in further detail below.

FIG. 3B illustrates a write coalescing data structure 313 in accordance with one or more embodiments of the present disclosure. The first column 312 indicates logical addresses (LAs) associated with sectors of data. The second column 314 includes start addresses of sectors of data in a buffer. The third column 316 includes end addresses of sectors of data in a buffer. The fourth column 318 includes pointers to logical addresses. The pointers can point to the next logical address in the write coalescing data structure. Entries in the write coalescing data structure 313 can be associated with unaligned sectors of data associated with two or more write commands that correspond to a common logical address identified by one or more indicators in the coalescing identification data structure. The entries in the write coalescing data structure 313 can identify and locate the sectors of data that are coalesced when written to the memory device.

In the example shown in FIG. 3B, each row in the write coalescing data structure includes a number of entries. Each entry corresponds to a sector of data that is stored in the buffer. Entry 319-0 corresponds to data associated with the logical address LA-0, the start address SA-0, the end address EA-0, and the pointer P-0. Entry 319-1 corresponds to data associated with the logical address LA-1, the start address SA-1, the end address EA-1, and the pointer P-1. Entry 319-2 corresponds to data associated with the logical address LA-2, the start address SA-2, the end address EA-2, and the pointer P-2. Entry 319-3 corresponds to data associated with the logical address LA-3, the start address SA-3, the end address EA-3, and the pointer P-3. Entry 319-4 corresponds to data associated with the logical address LA-4, the start address SA-4, the end address EA-4, and the pointer P-4. Entry 319-5 corresponds to data associated with the logical address LA-5, the start address SA-5, the end address EA-5, and the pointer P-5. Entry 319-6 corresponds to data associated with the logical address LA-6, the start address SA-6, the end address EA-6, and the pointer P-6.

Entry 319-7 corresponds to data associated with the logical address LA-7, the start address SA-7, the end address EA-7, and the pointer P-7.

In one or more embodiments, when a write command received by a controller and/or an indicator in a coalescing identification data structure refers to a logical page that another indicator in the coalescing identification data structure also refers to, the entries in the write coalescing data structure 313 can be populated using information related to the sectors of unaligned data that will be coalesced on one page.

For example, a controller can receive a write command that includes an unaligned portion of data. The unaligned portion of data can be associated with LA-0 to LA-3, which corresponding to logical page 0. An indicator, such as indicator 210-1 in FIG. 2, can be present in coalescing identification data structure and refer to a first unaligned portion of data, such as first unaligned portion 106-1 in FIG. 1, associated with LA-4 to LA-7, which corresponds to logical page 0. The unaligned portion of data associated with LA-0 to LA-3 and the first unaligned portion of data, which is associated with LA-4 to LA-7, are able to be coalesced because they to not share common logical addresses and correspond to the same logical page, e.g., logical page 0. Entries 319-0, 319-1, 319-2, and 319-3, which correspond to the unaligned portion of data, are entered into the write coalescing data structure 313 to be coalesced with the first unaligned portion of data. Entries 315-4, 315-5, 315-6, and 315-7 from read coalescing data structure 311 are copied to write coalescing data structure 313 as entries 319-4, 319-51, 319-6, and 319-7. The entries 315-4, 315-5, 315-6, and 315-7 are present in the read coalescing data structure because they are associated with a first unaligned portion of data, e.g., first unaligned portion of data 106-1 in FIG. 1, that has been received by the controller and has an indicator identifying the logical page corresponding to the first unaligned portion of data. Entries 319-4, 319-5, 319-6, and 319-7 are populated with LA-4 to LA-7, SA-4 to SA-7, EA-4 to EA-7, and P-4 to P-7, respectively, based on the logical addresses, start addresses, end addresses, and pointers associated with the first unaligned portion, e.g., first unaligned portion of data 106-1 in FIG. 1.

Entries 319-0, 319-1, 319-2, 319-3, 319-4, 319-5, 319-6, and 319-7 in write coalescing data structure 313 can be used by the controller when coalescing unaligned sectors of data associated with write commands having indicators referring to a common logical page. Entries 319-0, 319-1, 319-2, 319-3, 319-4, 319-5, 319-6, and 319-7 can be used by the controller to locate unaligned sectors data, to coalesce the unaligned sectors of data, and to write the coalesced sectors of data to a page in a memory device.

Figure 4:
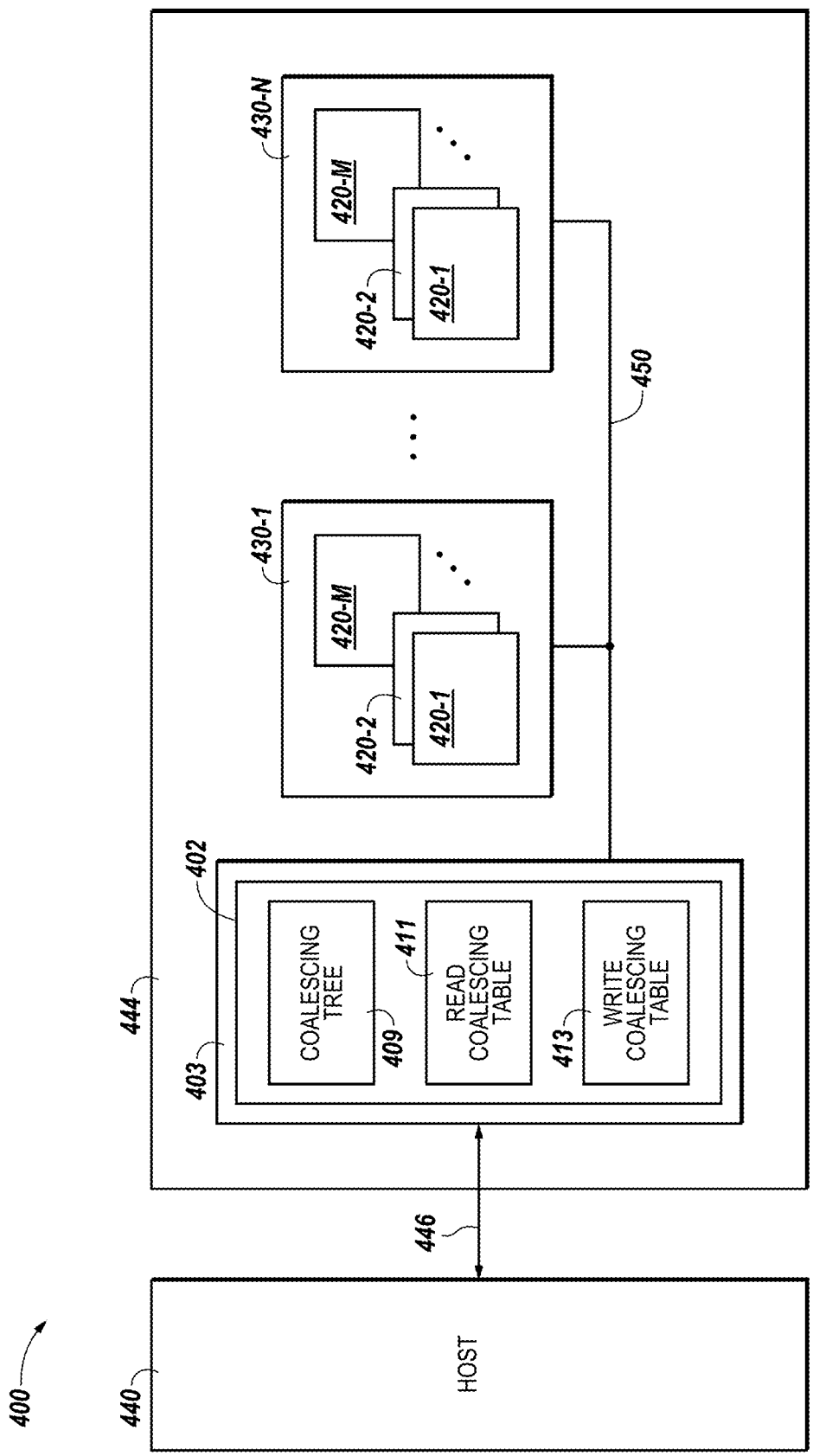
FIG. 4 is a functional block diagram of a computing system including at least one memory system in accordance with one or more embodiments of the present disclosure.

FIG. 4 is a functional block diagram of a computing system 400 including at least one memory system 444, in accordance with one or more embodiments of the present disclosure. In the embodiment illustrated in FIG. 4, the memory system 444 includes a controller 403 and one or more memory devices 430-1, . . . , 430-N coupled via bus 450. In this example, the controller 403 is external to the one or more memory devices 430-1, . . . , 430-N. The memory devices 430-1, . . . , 430-N can provide a storage volume for the memory system. The controller 403 can include hardware, firmware, and/or software. In one or more embodiments, the controller 403 can be an application specific integrated circuit (ASIC) coupled to a printed circuit board including a physical interface and memory devices 430-1, . . . , 430-N. The controller 403 can include a buffer 402. Buffer 402 can be a buffer such as buffer 102 of FIG. 1 and be used to store a coalescing identification data structure 409, a read coalescing data structure 411, a write coalescing data structure 413, data associated with commands received from the host, and data read from the memory devices 430-1, . . . , 430-N. The coalescing identification data structure 409 can be a coalescing identification data structure such as coalescing identification data structure 209 in FIG. 2. The read coalescing data structure 411 can be a read coalescing data structure such as read coalescing data structure 311 in FIG. 3A. The write coalescing data structure 413 can be a write coalescing data structure such as write coalescing data structure 313 in FIG. 3B.

As illustrated in FIG. 4, a host 440 can be coupled to the memory system 444. Host 440 can be a laptop computer, personal computer, digital camera, digital recording and playback device, mobile telephone, PDA, memory card reader, interface hub, among other host systems, and can include a memory access device, e.g., a processor.

In one or more embodiments, a physical host interface 446 can be in the form of a standardized interface. For example, when the memory system 444 is used for data storage in a computing system 400, physical host interface 446 can be a serial advanced technology attachment (SATA), peripheral component interconnect express (PCIe), or a universal serial bus (USB), among other connectors and interfaces. In general, however, a physical host interface 446 can provide an interface for passing control, address, data, and other signals between the memory system 444 and a host 440 having compatible receptors for the physical host interface.

The controller 403 can communicate with the memory devices 430-1, . . . , 430-N to read, write, and erase data, among other operations. That is, controller 403 can translate commands received from host 440 into the appropriate commands to achieve the desired access to a memory device 430-1, . . . , 430-N. The controller 403 can be configured to perform one or more embodiments described herein.

A memory device 430-1, . . . , 430-N can include one or more arrays of memory cells 420-1, 420-2, 420-M, e.g., non-volatile memory cells. The arrays 420-1, 420-2, 420-M can be flash arrays with a NAND architecture, for example. Embodiments are not limited to a particular type of memory device.

The embodiment of FIG. 4 can include additional circuitry that is not illustrated so as not to obscure embodiments of the present disclosure. For example, the memory system 444 can include address circuitry to latch address signals provided over I/O connections through I/O circuitry. Address signals can be received and decoded by a row decoder and a column decoder to access the memory devices 430-1, . . . , 430-N.

CONCLUSION

The present disclosure includes methods and systems for coalescing unaligned data. One method includes receiving a first write command associated with a first unaligned portion of data, receiving a second write command associated with a second unaligned portion of data, and coalescing the first unaligned portion of data and the second unaligned portion of data, wherein coalescing includes writing the first unaligned portion of data and the second unaligned portion of data to a page in a memory device.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
an array of memory cells; and
a controller, coupled to the array, configured to:
coalesce a first unaligned portion of data and a second unaligned portion of data located in a buffer on the controller in response to a first indicator in a coalescing data structure associated with the first unaligned portion of data and a second indicator in the coalescing data structure associated with the second unaligned portion of data referring a particular logic page, wherein the first unaligned portion of data and the second unaligned portion of data are stored in the buffer on the controller, remain in the controller prior to coalescing the first unaligned portion of data and the second unaligned portion of data, and are in the buffer when coalesced.

2. The apparatus of claim 1, wherein the controller is configured to write the first unaligned portion of data and the second unaligned portion of data to the array in a single write operation.

3. The apparatus of claim 1, wherein the controller is configured to coalesce the first unaligned portion of data and the second unaligned portion of data responsive to logical address associated with the first unaligned portion of data and the second unaligned portion of data corresponding to the particular logical page and the logical addresses not being in common.

4. The apparatus of claim 3, wherein the controller is configured to store the logical addresses associated with the first unaligned portion of data in a read coalescing data structure.

5. The apparatus of claim 3, wherein the controller is configured to store the logical addresses associated with the first unaligned portion of data and the second unaligned portion of data in a write coalescing data structure.

6. The apparatus of claim 1, wherein the controller is configured to create the second indicator that refers to the particular logical page corresponding to logical addresses associated with the second unaligned portion of data.

7. The apparatus of claim 1, wherein the buffer is configured to store the first unaligned portion of data and the second unaligned portion of data during coalescing.

8. A method for unaligned data coalescing, comprising:
receiving a number of write commands associated with a first unaligned portion of data and a second unaligned portion of data;
creating a first indicator corresponding to the first unaligned portion of data, wherein the first indicator refers to a logical address of the first unaligned portion of data and a first logical page;
placing the first indicator in a coalescing data structure;
creating a second indicator corresponding to the second unaligned portion of data, wherein the second indicator refers to a logical address of the second unaligned portion of data and the first logical page;
placing the second indicator in the coalescing data structure; and
coalescing the first unaligned portion of data and the second unaligned portion of data in response to the first indicator and the second indicator referring to the first logical page, wherein the first unaligned portion of data and the second unaligned portion of data are stored in a buffer on a controller, remain in the controller prior to coalescing the first unaligned portion of data and the second unaligned portion of data, and are in the buffer when coalesced.

9. The method of claim 8, wherein coalescing the first unaligned portion of data and the second unaligned portion of data includes writing the first unaligned portion of data and the second unaligned portion of data to a page in a memory device.

10. The method of claim 8, further including removing the first indicator and the second indicator from the coalescing data structure in response to coalescing the first unaligned portion of data and the second unaligned portion of data.

11. The method of claim 8, further including receiving the number of commands associated with a third unaligned portion of data.

12. The method of claim 11, further including creating a third indicator corresponding to the third unaligned portion of data, wherein the third indicator refers to a logical address of the third unaligned portion of data and a second logical page.

13. The method of claim 12, further including placing the third indicator in the coalescing data structure.

14. The method of claim 12, further including removing the third indicator from the coalescing data structure in response to coalescing the third unaligned portion of data with another unaligned portion of data.

15. An apparatus, comprising:
an array of memory cells; and
a controller, coupled to the array, configured to:
receive a first write command associated with a first unaligned portion of data and an aligned portion of data;
coalesce the first unaligned portion of data and a second unaligned portion of data in response to an indicator associated with the second unaligned portion of data referring to a logical page associated with the first unaligned portion of data and wherein the indicator is located in a coalescing data structure, wherein the first unaligned portion of data and the second unaligned portion of data are stored in a buffer on the controller, remain in the controller prior to coalescing the first unaligned portion of data and the second unaligned portion of data, and are in the buffer when coalesced; and write the aligned portion of data to a first page in the array of memory cells and write the first unaligned portion of data and the second unaligned portion of data to a second page in the array of memory cells.

16. The apparatus of claim 15, wherein the first unaligned portion of data and the second unaligned portion of data are associated with logical addresses that correspond to the logical page.

17. The apparatus of claim 15, wherein the controller is configured to store the first unaligned portion of data and the second unaligned portion of data in the buffer for coalescing.

18. The apparatus of claim 15, wherein the controller is configured to:

receive a second write command associated with a third unaligned portion of data and a third write command associated with a fourth unaligned portion of data; and store the third unaligned portion of data and the fourth unaligned portion of data in a buffer.

19. The apparatus of claim 18, wherein the controller is configured to coalesce the third unaligned portion of data and the fourth unaligned portion of data in response to a logical address of the third unaligned portion of data and a logical address of the fourth unaligned portion of data being associated with another logical page.

* * * * *